(12) United States Patent
Chubb et al.

(10) Patent No.: US 6,198,760 B1
(45) Date of Patent: Mar. 6, 2001

(54) SELECTIVE EMITTER PUMPED RARE EARTH LASER

(75) Inventors: Donald L. Chubb, Olmsted Falls; Martin O. Patton, Fairview Park, both of OH (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/332,249

(22) Filed: May 27, 1999

(51) Int. Cl.[7] ............................................ H01S 3/09

(52) U.S. Cl. ................................. 372/78; 372/69

(58) Field of Search ........................ 372/70, 72, 69, 372/34, 78, 28; 136/253

(56) References Cited

U.S. PATENT DOCUMENTS

| 3,179,898 | * | 4/1965 | Melter | 372/72 |
|---|---|---|---|---|
| 3,238,470 | * | 3/1966 | Mooney | 372/72 |
| 4,348,765 | * | 9/1982 | Oettinger | 372/78 |
| 4,483,007 | * | 11/1984 | Winston | 372/72 |
| 4,584,426 |   | 4/1986 | Nelson . | |
| 4,776,895 | * | 10/1988 | Goldstein | 136/253 |
| 4,894,837 | * | 1/1990 | DiFonzo et al. | 372/72 |
| 5,080,724 |   | 1/1992 | Chubb . | |
| 5,356,487 | * | 10/1994 | Goldstein et al. | 136/253 |
| 5,503,685 | * | 4/1996 | Goldstein | 136/253 |

* cited by examiner

Primary Examiner—Leon Scott, Jr.
(74) Attorney, Agent, or Firm—Kent N. Stone

(57) ABSTRACT

A selective emitter pumped rare earth laser provides an additional type of laser for use in many laser applications. Rare earth doped lasers exist which are pumped with flashtubes or laser diodes. The invention uses a rare earth emitter to transform thermal energy input to a spectral band matching the absorption band of a rare earth in the laser in order to produce lasing.

10 Claims, 1 Drawing Sheet

SELECTIVE EMITTER PUMPED RARE EARTH LASER

The invention described herein was made by employees of the United States Government and may be manufactured and used by or for the Government for Government purposes without the payment of any royalties thereon or therefor.

BACKGROUND OF THE INVENTION

This invention relates to lasers and in particular to lasers thermally pumped using rare earth selective emitters.

Selective emitters are devices for converting thermal energy into narrow band radiation. Most solid state materials have nearly a constant spectral emittance (gray body). The spectral emittance of a rare earth is characterized by several emission bands in the visible and near infrared region resulting from electronic transitions from the lowest excited states.

Selective emitters have been used in thermophotovoltaic energy conversion systems such as those described in U.S. Pat. Nos. 4,584,426 and 5,080,724.

Lasing in rare earths such as neodymium (Nd), holmium (Ho) and erbium (Er) in a host material such as yttrium aluminum garnet (YAG, $Y_3Al_5O_{12}$) has been achieved using flashlamp or laser diode pumping.

SUMMARY OF THE INVENTION

A laser includes an emitter having a selective energy emission band in response to applied thermal energy and a rare earth doped laser rod having an energy absorption band matching the emission band. The emitter and the rod are arranged to allow energy from the emitter to impinge on the rod.

Using a selective emitter allows thermal energy to be used as the input for the rare earth ion laser. Not only does using a selective emitter allow thermal energy to be the input, but it also results in higher laser efficiency than flashlamp or diode laser pumped rare earth ion lasers. Both the flashlamp and diode laser pumping mechanisms are not as efficient at converting the input energy to radiation matched to the absorption band of the laser medium.

DESCRIPTION OF THE PREFERRED EMBODIMENTS

Figure 1:
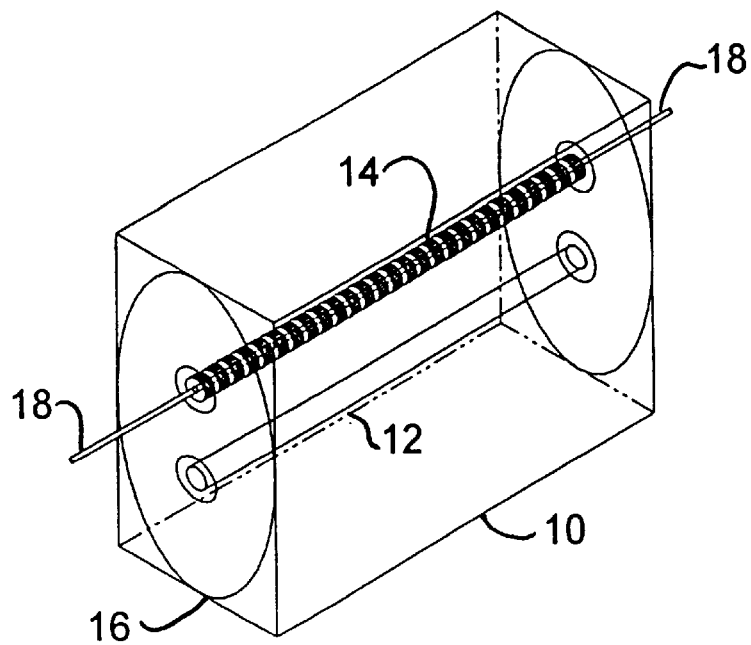
FIG. 1 is a perspective schematic view of a laser according to one aspect of the invention.

Referring to FIG. 1, a laser 10 or optical amplifier includes a circular cylindrical laser rod 12 and a circular cylindrical selective emitter 14. The rod 12 and the emitter 14 are located at respective foci of an elliptical cylindrical laser cavity 16. The internal walls of the cavity 16 are reflective and in the preferred embodiment the cavity 16 is under a vacuum.

A resistive heater 18 is located at the axis of the emitter 14. The heater 18 may be a refractory metal (e.g., molybdenum). The heater 18 preferably has a polished surface to minimize emittance from its surface. In the preferred embodiment, the emitter 14 is segmented into a series beads to minimize thermal stresses. As is known in the art, a mirror and window are provided at each end of the rod 12.

The rod 12 is composed of a crystal doped with a rare earth element and may be, for example, two millimeters in diameter and may include an attached unshown cooling fin.

The emitter 14 is composed of a selective emitting material that has a selective energy emission band in response to applied thermal energy. The emitter 14 may be, for example, Tm-YAG ($Tm_x$, $Y_{3-x}Al_5O_{12}$), thulium aluminum garnet ($Tm_3 Al_5O_{12}$) or thulium oxide ($Tm_2O_3$). The material of the emitter 14 may be either polycrystalline or a single crystal.

In operation, an electrical current from an unshown source is passed through the heater 18 causing the emitter 14 to heat and emit in the selective energy emission band characteristic to the particular emitter material. Because of the elliptical shape of the cavity 16, except for end losses, all or substantially all of the radiation that leaves the emitter 14 impinges upon the rod 12.

The rod 12 is doped with a rare earth having an energy absorption band matching the emission band of the emitter 14 (e.g., the emitter 14 and the rod 12 contain the same rare earth, for example, thulium). The absorbed radiation will produce excited states in the rod 12, producing a population inversion between an energy level in the first excited state manifold and an energy level in the ground state manifold, and thus lasing in the rod 12. For a rod 12 doped with just a single rare earth such as thulium, the emitter 14 may have to be operated at a temperature of greater than 2500° K for the laser 10 to operate.

In the preferred embodiment, the rod 12 is doped with more than one rare earth. In this case, one rare earth serves as the energy absorber and corresponds to the emission band of the emitter 14. A second rare earth is the laser species. The population inversion is produced by energy transfer from the absorber rare earth to the lasing rare earth. For example, the rod 12 may be composed of Tm-Ho-YAG ($Tm_x$, $Ho_y$, $Y_{3-x-y}Al_5O_{12}$) or Tm-Ho-YLF (yttrium lithium fluoride) ($Tm_x$, $Ho_y$, $Y_{1-x-y}LiF$). The Tm doping level (x) should be large while the Ho doping level (y) should be low in order to produce a population inversion in the Ho for emitter 14 temperatures of approximately 2000° K.

In order to keep the lower laser level density low, the laser rod 12 must be kept relatively cool. This can be accomplished by a combination of the vacuum in the cavity 16 and a thermal connection such as an unshown longitudinal rib between the rod 12 and the cavity 16 which is in turn cooled by a suitable means.

Figure 2:
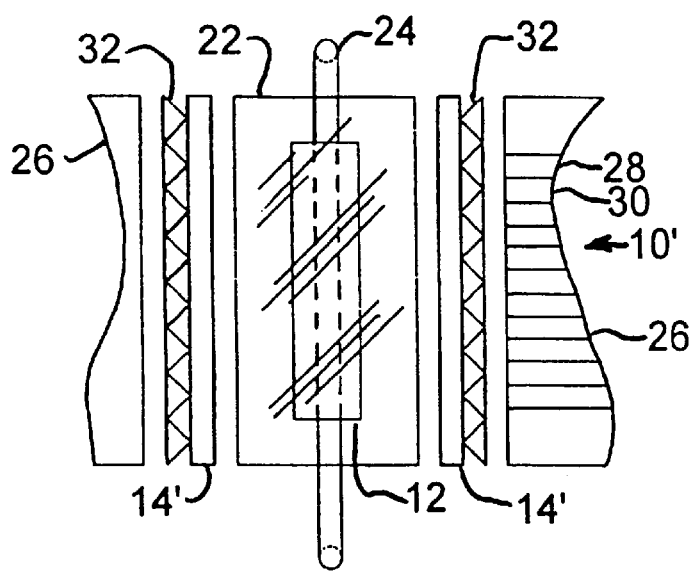
FIG. 2 is a top plan view of a laser according to another aspect of the invention with portions cut away.
Figure 3:
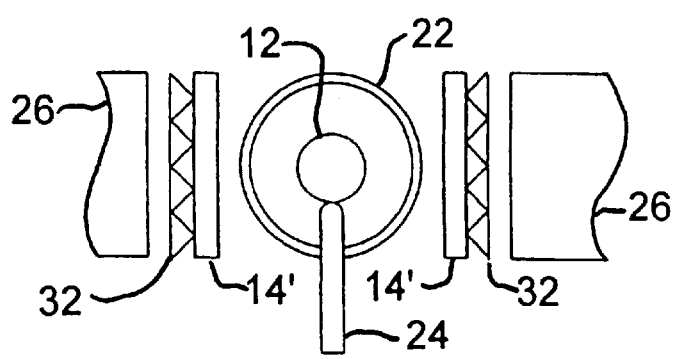
FIG. 3 is a front elevation view of the laser of FIG. 2 with portions cut away.

Referring to FIGS. 2 and 3, an additional embodiment of the laser 10' includes a laser rod 12, and selective emitters 14'. The rod 12 is contained in an evacuated chamber 22 that allows energy from the emitters 14' to impinge on the rod 12. The chamber 22 may be, for example, composed of sapphire. A coolant line 24 is in thermal contact with the rod 12. Planar combustors 26 are arranged adjacent to the emitters 14'.

The combustors 26 may be formed of a matrix of interspersed tubes carrying fuel 28 and oxidizer 30 (e.g., methane and oxygen).

In operation, the combustors 26 produce flame fronts 32 that heat the emitters 14', which then emit in an energy band matching the rare earth absorber in the rod 12, resulting in lasing in the rod 12. To reduce the lower laser level density, a cooling fluid is passed through the line 24 (e.g., liquid nitrogen (77° K)).

It is also possible to surround the rod 12 with additional emitter/combustion pairs or to use an annular emitter with suitable external combustors.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A laser comprising:

a resonant cavity;

a combustion-heated emitter having a selective energy emission band; and a rare earth doped laser rod within said resonant cavity having an energy absorption band matching said selective energy emission band, said emitter and rod being arranged to allow photon energy from said emitter to pump said rod.

2. A laser according to claim 1 wherein said emitter is composed of rare earth elements.

3. A laser according to claim 1, further comprising a planar combustor arranged to heat said emitter.

4. A laser according to claim 1, further comprising a vacuum chamber, wherein said rod is located within said chamber, said emitter is located outside said chamber and said chamber allows energy from said emitter to pump said rod.

5. A laser according to claim 1, wherein said emitter is yttrium aluminum garnet doped with thulium.

6. A laser according to claim 1, wherein said emitter is thulium aluminum garnet.

7. A laser according to claim 1, wherein said emitter is thulium oxide.

8. A laser according to claim 1, wherein said rod is doped with an absorbing rare earth and a differing lasing rare ear.

9. A laser according to claim 1, wherein said rod is yttrium aluminum garnet doped with thulium and holium.

10. A laser according to claim 1, wherein said rod is yttrium lithium fluoride doped with thulium and holium.

* * * * *